United States Patent
Bang et al.

(10) Patent No.: US 7,738,395 B2
(45) Date of Patent: Jun. 15, 2010

(54) COMMUNICATION SYSTEM FOR IMPROVING DATA TRANSMISSION EFFICIENCY OF TCP IN A WIRELESS NETWORK ENVIRONMENT AND A METHOD THEREOF

(75) Inventors: Jong-ho Bang, Suwon-si (KR); Ji-hoon Lee, Cheongiu-si (KR); Byoung-joon Lee, Seongnam-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1590 days.

(21) Appl. No.: 10/968,352

(22) Filed: Oct. 20, 2004

(65) Prior Publication Data

US 2005/0232147 A1  Oct. 20, 2005

(30) Foreign Application Priority Data

Oct. 31, 2003   (KR) ............... 10-2003-0076681

(51) Int. Cl.
*G01R 31/08* (2006.01)
*G06F 11/00* (2006.01)
*H04L 12/28* (2006.01)
*H04L 12/56* (2006.01)

(52) U.S. Cl. ............... 370/253; 370/389; 370/392; 370/394

(58) Field of Classification Search ............... 370/229, 370/232, 235, 252, 253, 389, 392, 394, 400, 370/401
See application file for complete search history.

(56) References Cited

U.S. PATENT DOCUMENTS

| | | | |
|---|---|---|---|
| 5,793,768 A * | 8/1998 | Keshav | 370/400 |
| 5,974,028 A * | 10/1999 | Ramakrishnan | 370/229 |
| 6,424,626 B1 * | 7/2002 | Kidambi et al. | 370/236 |
| 6,438,101 B1 * | 8/2002 | Kalampoukas et al. | 370/229 |
| 6,480,477 B1 * | 11/2002 | Treadaway et al. | 370/314 |
| 6,741,563 B2 * | 5/2004 | Packer | 370/231 |
| 6,754,228 B1 * | 6/2004 | Ludwig | 370/468 |
| 6,904,286 B1 * | 6/2005 | Dantu | 455/452.2 |
| 6,968,379 B2 * | 11/2005 | Nielsen | 709/226 |

(Continued)

FOREIGN PATENT DOCUMENTS

JP   2001-156795   6/2001

(Continued)

*Primary Examiner*—Chi H Pham
*Assistant Examiner*—Farah Faroul
(74) *Attorney, Agent, or Firm*—Staas & Halsey LLP (57) ABSTRACT

A communication system having a source node, at least one mobile node, and a router that transmits data packets transmitted from the source node to a corresponding one of the at least one mobile node and multiplexes response signals to the data packets received from the corresponding one of the at least one mobile node to transmit the multiplexed response signals to the source node. The communication system includes: a link monitoring unit which calculates a capacity of a wireless link between the router and the corresponding one of the at least one mobile node; and a congestion control and adjustment unit which adjusts window field values in the response signals according to the calculated capacity. The router transmits the response signals, the response signals including the adjusted window field values to the source node, and the source node sequentially transmits the data packets on the basis of the adjusted window field values.

17 Claims, 4 Drawing Sheets

U.S. PATENT DOCUMENTS

| | | |
|---|---|---|
| 7,061,586 B2 * | 6/2006 | Sytsma et al. .................. 355/69 |
| 7,352,700 B2 * | 4/2008 | Chan et al. .................. 370/235 |
| 2002/0154602 A1 * | 10/2002 | Garcia-Luna-Aceves et al. .................. 370/230 |
| 2003/0117974 A1 * | 6/2003 | Kang .................. 370/328 |
| 2004/0015591 A1 * | 1/2004 | Wang .................. 709/228 |
| 2005/0013245 A1 * | 1/2005 | Sreemanthula et al. ...... 370/229 |
| 2006/0209838 A1 * | 9/2006 | Jung et al. .................. 370/394 |
| 2007/0115814 A1 * | 5/2007 | Gerla et al. .................. 370/230 |
| 2008/0037420 A1 * | 2/2008 | Tang .................. 370/229 |
| 2008/0144509 A1 * | 6/2008 | Chan et al. .................. 370/235 |

FOREIGN PATENT DOCUMENTS

| KR | 10-2003-0054981 | 7/2003 |
|---|---|---|

* cited by examiner

COMMUNICATION SYSTEM FOR IMPROVING DATA TRANSMISSION EFFICIENCY OF TCP IN A WIRELESS NETWORK ENVIRONMENT AND A METHOD THEREOF

CROSS-REFERENCE TO RELATED APPLICATION

This application claims the benefit of Korean Patent Application No. 2003-76681, filed Oct. 31, 2003 in the Korean Intellectual Property Office, the disclosure of which is incorporated herein by reference.

BACKGROUND OF THE INVENTION

1. Field of the Invention

The present invention generally relates to a communication system capable of system having an improving a data transmission efficiency of a Transmission Control Protocol (TCP) in a wireless network environment and a method thereof.

2. Description of Related Art

Figure 1:
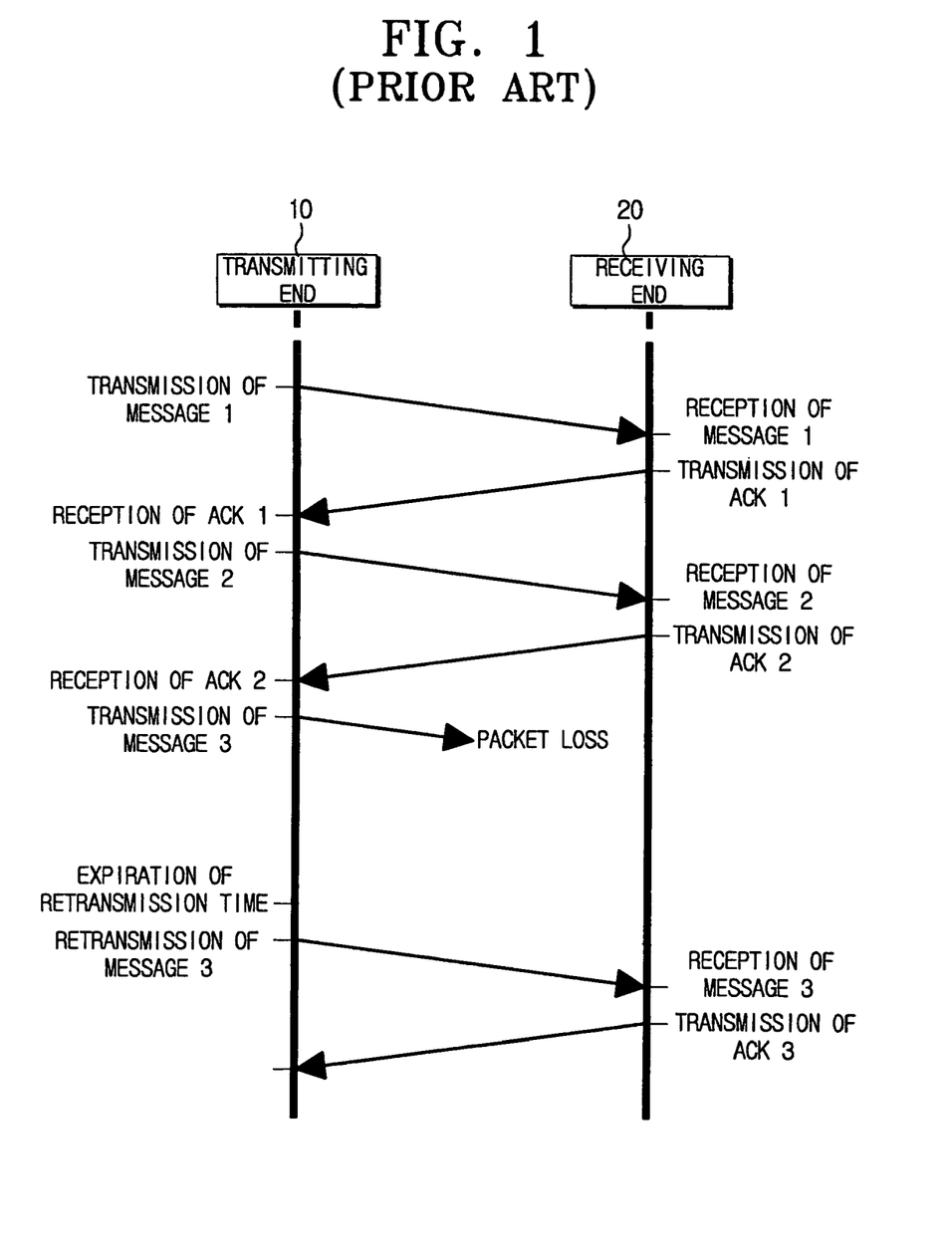
FIG. 1 is a view illustrating an example of data transmission and reception between a transmitting end and a receiving end of a communication system according to the TCP of the conventional communication system.

FIG. 1 is a view illustrating an example of data transmission and reception of a transmitting end 10 and a receiving end 20 according to the TCP of the conventional communication system. Referring to FIG. 1, to heighten the reliability of data transmission and reception, the TCP uses a method of transmitting an acknowledgement (ACK) packet so that the receiving end 20 acknowledges the data reception to the transmitting end 10. If the ACK packet is not received after a specified time elapses, the transmitting end 10 determines that the packet is lost during the transmission, and retransmits the packet.

In the existing wire network environment, most packet losses occur due to network congestion. If the packet loss occurs due to the network congestion, the TCP drives a congestion control mechanism for controlling the amount of data transmission. The TCP congestion control mechanism may be a slow start mechanism, a congestion avoidance mechanism, or a fast retransmit and recovery mechanism, and the amount of data transmission is adjusted according to the state of network through this mechanism.

In a wireless network, being different from the wire network, most packet losses occur due to the characteristic of a wireless link, that is, high error rate and handoff, rather than the network congestion. Accordingly, the control mechanism of the TCP proposed to match the characteristic of the wire network environment cannot properly cope with a mobile network environment. Specifically, since the packet loss wirelessly occurring due to a packet error is processed in the same manner as that occurring due to the network congestion, the slow start or fast recovery mechanism reduces a congestion window size in the same manner as the packet loss occurring due to the congestion. In other words, if the TCP of the wire network is applied to the wireless network, because all the packet losses occur due to the network congestion, the TCP unnecessarily lowers the transmission speed. As a result, due to the repeated packet losses, the bandwidth of the link is wasted, and this deteriorates the performance of the whole network.

For the above-described reason, it is recognized as an important matter to efficiently use the TCP in the wireless network. That is, it is important to improve the TCP, which has been developed to be suitable to the wire network, to match the characteristic of the wireless network and to properly cope with the packet loss due to the packet error rather than due to the congestion.

Techniques for solving TCP performance deterioration in the wireless network environment may be divided into a split connection method, a proxy-based method, and an end-to-end method. A representative split connection method may be an Indirect-TCP (I-TCP) method. The I-TCP method controls the TCP by dividing one TCP connection into two connections, that is, one connection between a source node and a wireless router and the other connection between the wireless router and a moving node, in order to conceal the packet loss on the wireless link from the source node.

A representative proxy-based method may be a snoop method. The snoop method controls the wireless router to retransmit the packet when the packet loss occurs on the wireless link. The Internet Engineering Task Force (IETF), which is an Internet standardization group, recommends the snoop method. However, this method has the drawbacks in that it cannot improve the performance deterioration of the TCP when a long disconnection occurs on the wireless link. Specifically, when the packet loss occurs on the wireless link, the source node does not retransmit the packet, but the wireless router locally retransmits the packet. If a degradation between a specified terminal and the wireless link is maintained during the retransmission of the packet, packet transmission to other terminals is not performed due to the repeated attempts to retransmit the packet to the specified terminal, and thus the performance deterioration of the TCP is not improved.

A representative end-to-end method may be a Freeze-TCP (F-TCP) method. The F-TCP method solves the problems of performance deterioration by informing the source node that the source node maintains its state before the occurrence of the error when the packet loss occurs on the wireless link. The F-TCP method focuses on the solving of the problems of performance deterioration during a handoff.

BRIEF SUMMARY

Embodiments of the present invention solve the above-identified and/or other problems and disadvantages and provide at least the advantages described hereinafter.

Embodiments of the present invention provide a communication system and method which can improve a data transmission efficiency of a TCP by solving a congestion problem based on a packet restoration system through a proxy-based local retransmission of packet, considering that a wireless router has a high probability of congestion occurrence due to the characteristic of a wireless link having a smaller bandwidth than a wire network in an asymmetrical wireless network environment.

To achieve the above and/or other aspects and features of the present invention, there is provided a communication system having a source node, at least one mobile node, and a router that transmits data packets transmitted from the source node to a corresponding one of the at least one mobile node and multiplexes response signals to the data packets received from the corresponding one of the at least one mobile node to transmit the multiplexed response signals to the source node. The communication system includes: a link monitoring unit which calculates a capacity of a wireless link between the router and the corresponding one of the at least one mobile node; and a congestion control and adjustment unit which adjusts window field values in the response signals according to the calculated capacity. The router transmits the response signals, the response signals including the adjusted window field values to the source node, and the source node sequentially transmits the data packets on the basis of the adjusted window field values.

The router may include a buffer which stores the data packets transmitted from the source node, and stores data packets which are copied and stored when the data packets are transmitted from the router to the mobile nodes. The router may include a control unit that retransmits the copied data packets if the response signals to the data packets are not received from the mobile nodes within a predetermined time, and deletes the copied data packets if the response signals are received.

The link monitoring unit may calculate the capacity of the wireless link by a ratio of a bandwidth of the wireless link to the number of response signals transmitted from the mobile nodes for a unit time. The congestion control and adjustment unit may compare the window field value in the response signal from the transmitting node with the capacity of the wireless link. If the capacity of the wireless link is smaller than the window field value, the congestion control and adjustment unit adjusts the window field value in the response signal to be transmitted to the source node, to the capacity of the wireless link.

In another aspect of the present invention, there is provided a communication method in which a router connected to a source node and at least one mobile node receives data packets from the source node and transmits the data packets to the at least one mobile node. The communication method includes receiving response signals to the data packets from the mobile nodes, adjusting window field values in the response signals, the router transmitting the response signals of the adjusted window field values to the source node, and sequentially transmitting the data packets on the basis of the adjusted window field values of the received response signals.

The communication method may include storing the data packets transmitted from the source node in a buffer of the router, and copying and storing the transmitted data packets in the buffer when the data packets are transmitted to the mobile nodes. The communication method may include retransmitting the copied data packets if the response signals to the transmitted data packets are not received from the mobile nodes within a predetermined time, and deleting the copied data packets if the response signals are received.

The adjusting the window field values may include calculating a capacity of a wireless link by a ratio of a bandwidth of the wireless link to the number of response signals transmitted from the mobile nodes for a unit time in order to reflect a propensity of the wireless link having a relatively small bandwidth in comparison to a wire link, comparing the window field value in the response signal with the capacity of the wireless link, and if the capacity of the wireless link is smaller than the window field value in the response signal, adjusting the window field value in the response signal to the capacity of the wireless link.

According to another aspect of the present invention, there is provided a communication method including: sequentially transmitting data packets from a source node to a router; storing the data packets received from the source node in a storage area of a buffer of the router; transmitting the data packets stored in the buffer to a mobile node via a wireless link in a specified order and at specified intervals while copying and storing the data packets transmitted to the mobile node in the buffer; determining whether a response packet is received from the mobile node within a specified time after the data packets are transmitted to the mobile node; retransmitting the copied data packets stored in the buffer when the response packet is not received within the specified period of time; deleting the copied data packets when the response packet is received within the specified time; determining the capacity of the wireless link; determining a window field value based on the capacity of the wireless link; transmitting the response packet of the adjusted window field value to the source node; and transmitting subsequent sequential data packets from the source node to the router based on the window field value of the received response packet.

According to another aspect of the present invention, there is provided a method of lessening network congestion between a source node and a mobile node through a wireless link provided by a router and having an asymmetrical bandwidth environment. The method includes: determining the capacity of the wireless link; adjusting a window field value based on the capacity of the wireless link; transmitting the response packet of the adjusted window field value to a source node; and transmitting sequential data packets from the source node to the router based on the window field value.

According to still another aspect of the present invention, there is provided a method of preventing congestion in a router having a wire network link to a source node and wireless network link to a mobile node, including: comparing a capacity of the wireless link with a window field value of the mobile node; and adjusting downwardly an amount of data transmitted from the source node based on a smallest bandwidth capacity of any portion of the wireless link.

Additional and/or other aspects and advantages of the present invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF EMBODIMENT

Reference will now be made in detail to an embodiment of the present invention, an example of which is illustrated in the accompanying drawings, wherein like reference numerals refer to the like elements throughout. The embodiment is described below to explain the present invention by referring to the figures.

A communication system for improving a data transmission efficiency of a Transmission Control Protocol (TCP) in a wireless network environment and a method thereof according to an embodiment of the present invention will be described.

Figure 2:
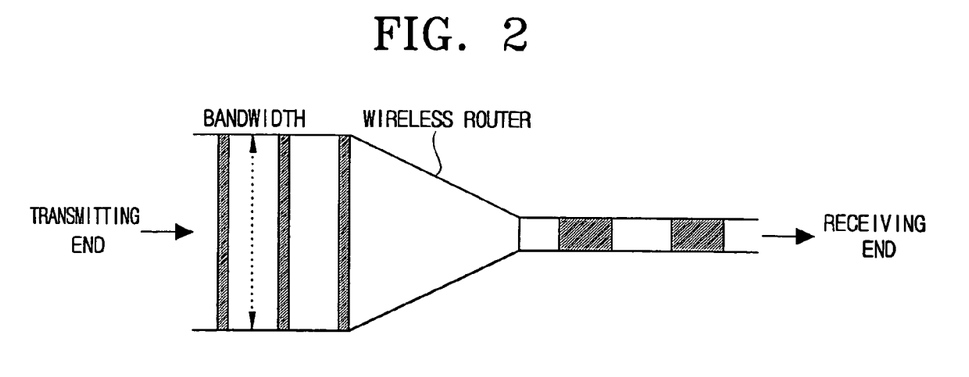
FIG. 2 is a view illustrating an example of an asymmetrical characteristic of a bandwidth in a wireless network environment.

FIG. 2 is a view illustrating an example of an asymmetrical characteristic of a bandwidth in a wireless network environment. Referring to FIG. 2, the bandwidth of a wire network can be allocated in the range of 155~655 Mbps, and the bandwidth of a wireless network can be allocated in the range of 10 Mbps. Accordingly, in the asymmetrical bandwidth environment, a lot of time delay is produced in transmitting data packets and ACK packets through the wireless network due to a small bandwidth of the wireless network, and thus the TCP transmission rate may be reduced due to the packet loss and packet accumulation caused by the congestion of the wireless network. The present invention provides a communication system and a method capable of improving the TCP transmission rate by solving the congestion problem of the wireless network.

In the present embodiment, the system is implemented based on the snoop method that is the representative proxy-based method. According to the present embodiment, when the packet loss occurs on the wireless link, the source node does not retransmit the packets, but the wireless router locally retransmits the packets.

Figure 3:
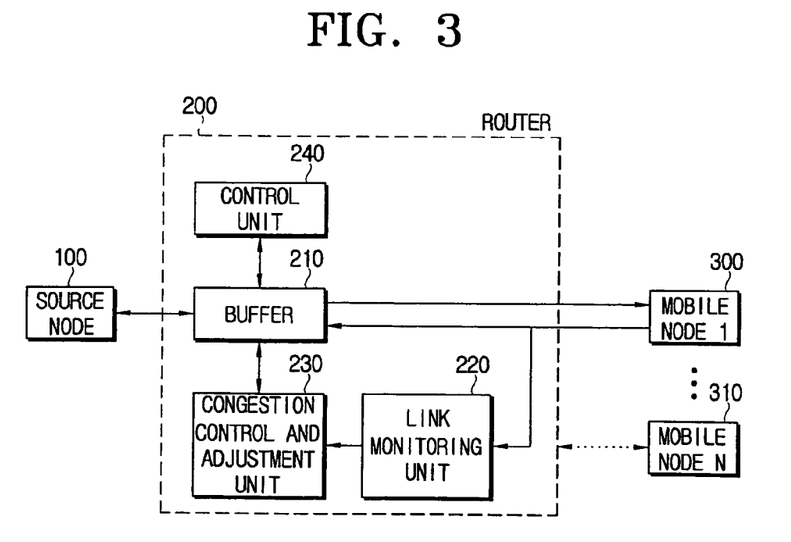
FIG. 3 is a block diagram illustrating the configuration of a communication system according to an embodiment of the present invention.

FIG. 3 is a block diagram illustrating the configuration of a communication system according to the embodiment of the present invention. Referring to FIG. 3, the communication system includes a source node 100, a router 200, and mobile nodes 300 to 310 (mobile node 1 to mobile node N). The router 200 includes a buffer 210, a link monitoring unit 220, a congestion control and adjustment unit 230 and a control unit 240.

The source node 100 indicates a wire or wireless communication appliance that transmits data packets in view of unidirectionally transmitted data packet. The mobile nodes 300 to 310 indicate mobile communication appliances, wirelessly connected to the router, for receiving the data packets from the source node 100. The router 200 connects separated networks using the same transmission protocol, and connects the source node 100 to the mobile node 300.

At least one of the mobile nodes 300 to 310, which is connected to the router 200, receives the data packets transmitted from the source node 100, and transmits the response signal to the received data packets to the router 200. In the present embodiment, the mobile nodes 300 to 310 transmit an ACK packet to the router 200 as the response signal.

Figure 4:
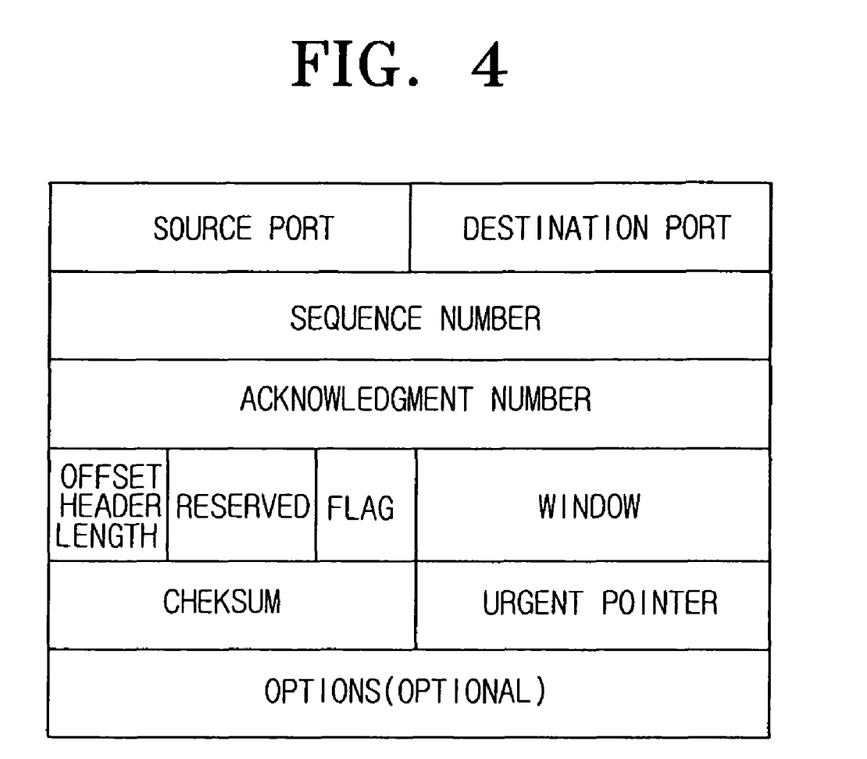
FIG. 4 is a view illustrating a header of a TCP protocol.

FIG. 4 is a view illustrating a header of a TCP protocol. The header of the TCP protocol includes a window field value for flow control of data. The window field value indicates the size of a usable buffer at a certain time point, and the mobile node 300 transmits information on the size of the remaining buffer to the source node 100, which is called a window advertisement. The source node 100, when transmitting the next data, transmits the data by adjusting the window field value based on the window advertisement. If the ACK packet in response to the data transmitted from the source node 100 is not received from the mobile node 300 to the router 200 within a specified time, the router 200 determines that the transmitted data is lost, and retransmits the corresponding data.

Referring to FIG. 3, the router 200 receives and multiplexes the response signals transmitted from the mobile nodes 300 to 310. The router 200 transmits the multiplexed response signals to the source node 100 through a high-rate backbone circuit. The router 200 also transmits the data packets transmitted from the source node 100 to the mobile nodes 300 to 310.

In a specified area of the buffer 210 provided in the router 200, the data packets transmitted from the source node 100 are sequentially stored by mobile nodes 300 to 310. When the data packets are transmitted to the corresponding mobile nodes 300 to 310, the transmitted data packets are copied and stored in a specified area of the buffer 210.

The control unit 240 transmits the sequentially received data packets to the corresponding mobile nodes 300 to 310 in a specified order. For example, if the ACK packet transmitted from the mobile node 300 is not received within a specified time after the transmission of the data packets, the control unit 240 retransmits the corresponding copied data packets stored in the buffer 210 to the mobile node 300, and if the ACK packet is received within the specified time, the control unit 240 deletes the corresponding copied data packets stored in the buffer 210.

The link monitoring unit 220 detects the number of ACK packets received for a unit time by monitoring if the ACK packets transmitted from the mobile node 300 are received in the buffer 210, and calculates the capacity of the wireless link between the router 200 and the mobile node 300 using a detection result. The capacity of the wireless link can be calculated by a ratio of a bandwidth of the wireless link to the number of ACK packets detected for a unit time. The capacity of the wireless link calculated by the link monitoring unit 220 is output to the congestion control and adjustment unit 230.

The congestion control and adjustment unit 230 reads out the window field value in the ACK packet from the buffer 210, and compares the window field value with the capacity of the wireless link calculated by the link monitoring unit 220. If the capacity of the wireless link is smaller than the window field value as a result of comparison, the congestion control and adjustment unit 230 adjusts the window field value to the capacity of the wireless link. The ACK packet of the changed window field value is transmitted to the source node 100, and the source node 100 transmits the sequential data packets to the router 200 based on the received window field value.

As a result, congestion in the router 200 having the wire network and wireless network interfaces is prevented in advance through the comparison of the capacity of the wireless link with the window field value of the mobile node. Specifically, the amount of data transmission in the source node 100 is not adjusted by the state of the whole network, but is adjusted by the capacity of the wireless link having the smallest bandwidth on the transmission path. Since more data packets are crowded in the router 200 as the number of received ACK packets becomes greater, the congestion in the router 200 can be prevented through a downward adjustment of the window field value transferred to the source node 100.

Figure 5:
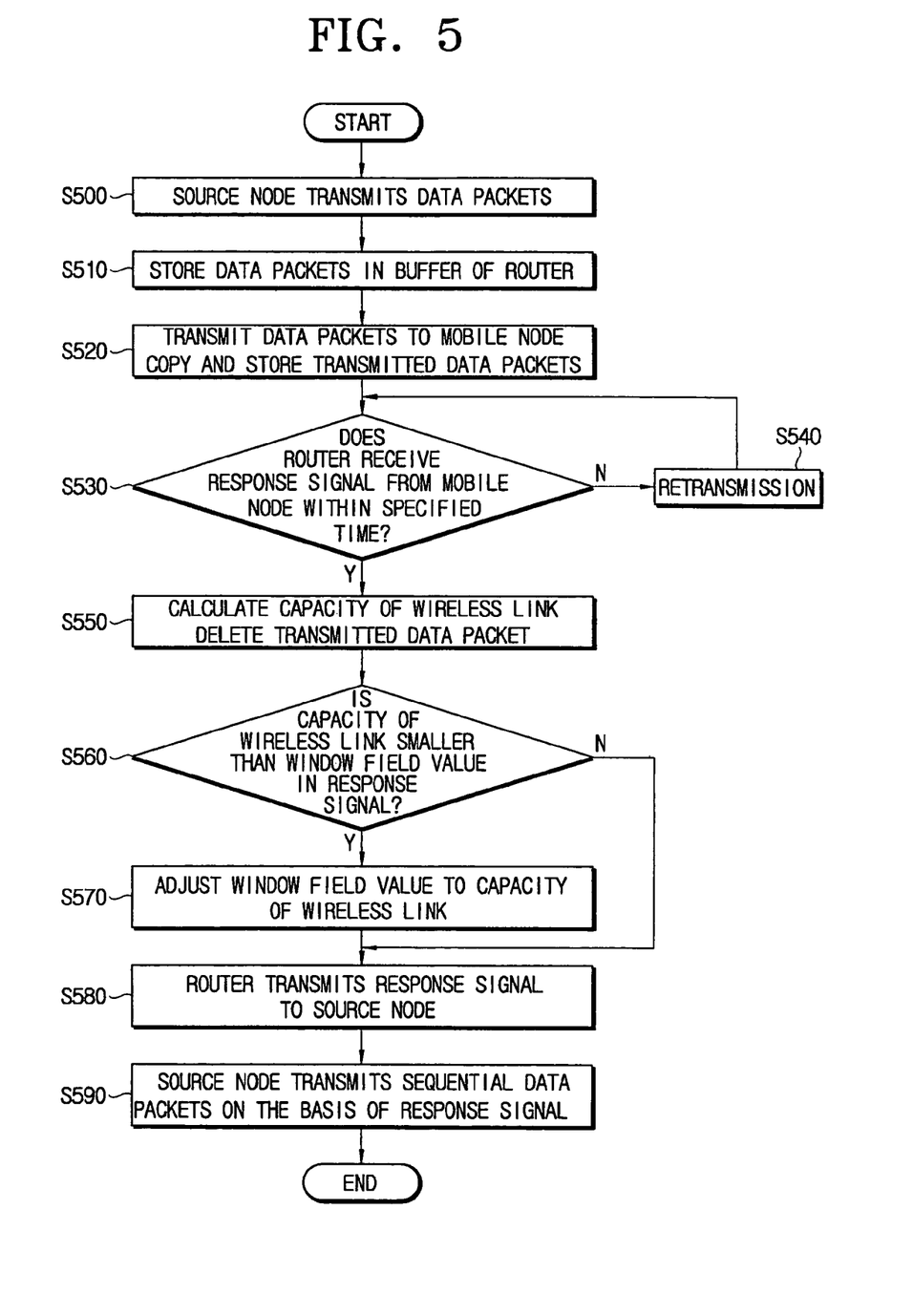
FIG. 5 is a flowchart illustrating a communication method according to an embodiment of the present invention.

FIG. 5 is a flowchart illustrating a communication method according to the present embodiment of the present invention.

Referring to FIGS. 3 and 5, the source node 100 sequentially transmits data packets to the router 200 in order to transmit the data corresponding to a plurality of mobile nodes 300 to 310 at operation S500. The transmitted data packets are stored in a storage area of the buffer 210 of the router 200 at operation S510. The data packets stored in the buffer 210 are transmitted to the mobile nodes 300 to 310 in a specified order and at specified intervals, and at this time, the transmitted data packets are copied and stored in a storage area of the buffer 210 at operation S520.

The control unit 240 detects whether any response signal (ACK packet) transmitted from the mobile node 300 is received within a specified time after the data packets are transmitted to the mobile node 300 at operation S530. If the ACK packet is not received, the control unit 240 retransmits the copied data packets stored in the buffer 210 at operation S540.

If the ACK packet is received within the specified time, the control unit 240 deletes the corresponding copied data packets stored in the buffer 210. The link monitoring unit 220 counts the number of ACK packets received for a unit time by monitoring the ACK packets received in the router 200, and calculates the capacity of the wireless link using the counted number of ACK packets at operation S550. The capacity of the wireless link can be obtained by calculating the ratio of the bandwidth of the wireless link to the number of ACK packets received for a unit time.

The congestion control and adjustment unit 230 compares the window field value in the ACK packet with the calculated capacity of the wireless link, and determines the sizes at operation S560. If the window field value is less than the capacity of the wireless link as a result of determination, the congestion control and adjustment unit 230 transmits the ACK packet to the source node 100, while if the capacity of the wireless link is less than the window field value, the congestion control and adjustment unit 230 adjusts the window field value in the ACK packet to the capacity of the wireless link at operation S570. The fact that the capacity of the wireless link is smaller than the window field value means that it is possible to transmit data of which the capacity is larger than that corresponding to the existing window field value. The router 200 transmits the ACK packet of the adjusted window field value to the source node 100 at operation S580.

The source node 100 transmits the sequential data packets based on the window field value of the ACK packet at operation S590. Here, by transmitting the data packets based on the adjusted window field value, that is, based on the present capacity of the wireless link that is smaller than the existing window field value, the packet transmission efficiency can be improved in the environment where no congestion of the wireless link occurs.

According to the described embodiment of the present invention, the problem of the congestion occurring in the wireless router when the TCP-based data communication service is provided in the wireless network environment and the problem of the lowered performance can be solved. By adjusting the window field value of the received packet to the capacity of wireless resource having a small bandwidth on an end-to-end path, unnecessary network congestion can be avoided. Also, by setting the amount of end-to-end data transmission to the minimum amount of resource on the path, the waste of the wire resource can be prevented. That is, the described embodiment of the present invention can solve the asymmetrical bandwidth problem between the wire network and the wireless network and the overflow problem of the wireless link, and can be compatible with the existing TCP protocol stack.

Although an embodiment of the present invention has been shown and described, the present invention is not limited to the described embodiment. Instead, it would be appreciated by those skilled in the art that changes may be made in the embodiment without departing from the principles and spirit of the invention, the scope of which is defined by the claims and their equivalents.

What is claimed is:

1. A communication system having a source node, at least one mobile node, and a router that transmits data packets transmitted from the source node to a corresponding one of the at least one mobile node and multiplexes response signals to the data packets received from the corresponding one of the at least one mobile node to transmit the multiplexed received response signals to the source node, comprising:
   a link monitoring unit which calculates a capacity of a wireless link between the router and the corresponding one of the at least one mobile node; and
   a congestion control and adjustment unit which adjusts window field values in the received response signals according to the calculated capacity,
   wherein the router transmits the received response signals, the received response signals including the adjusted window field values to the source node, and the source node sequentially transmits the data packets on the basis of the adjusted window field values,
   wherein the link monitoring unit calculates the capacity of the wireless link based on a ratio of a bandwidth of the wireless link to a number of received response signals transmitted from mobile nodes for a unit time.

2. The communication system as claimed in claim 1, wherein the router includes a buffer which: stores the data packets received from the source node; and which stores data packets which are copied and stored when the data packets are transmitted from the router to the at least one mobile node.

3. The communication system as claimed in claim 2, wherein the router includes a control unit which retransmits the copied data packets when the received response signals are not received from the at least one mobile node within a specified time, and deletes the copied data packets when the received response signals are received.

4. The communication system as claimed in claim 1, wherein the congestion control and adjustment unit compares one of the window field values in the received response signals with the capacity of the wireless link, and when the capacity of the wireless link is less than the window field value, the congestion control and adjustment unit adjusts the window field value to the capacity of the wireless link.

5. A communication method in which a router connected to a source node and at least one mobile node receives data packets from the source node and transmits the data packets to the at least one mobile node, comprising:
   receiving response signals to the data packets from the at least one mobile node;
   calculating a capacity of a wireless link between the at least one mobile node and the router by the router;
   adjusting window field values in the received response signals;
   transmitting the received response signals of the adjusted window field values to the source node; and
   sequentially transmitting the data packets on the basis of the adjusted window field values
   wherein the calculating of the capacity of the wireless link includes calculating the capacity of the wireless link based on a ratio of a bandwidth of the wireless link to a number of the received response signals received from the at least one mobile node for a unit time.

6. The communication method as claimed in claim 5, further comprising:
   storing the data packets transmitted from the source node in a buffer of the router; and
   copying and storing the transmitted data packets in the buffer when the data packets are transmitted to the at least one mobile node.

7. The method of claim 6, wherein the window field value indicates a size of usable buffer space in the buffer at a certain point in time.

8. The communication method as claimed in claim 6, further comprising retransmitting the copied data packets when the received response signals are not received from the at least one mobile node within a specified time, and deleting the copied data packets when the received response signals are received.

9. The communication method as claimed in claim 8, wherein a control unit of the router controls the retransmitting of the copied data packets.

10. The communication method as claimed in claim 5, wherein the adjusting includes:

comparing one of the window field values in the received response signal with the capacity of the wireless link; and adjusting the window field value in the received response signal to the capacity of the wireless link if the capacity of the wireless link is smaller than the window field value in the received response signal.

11. The method of claim 5, wherein the window field value is located in a header of a transmission control protocol.

12. A communication method in which a router connected to a source node and at least one mobile node receives data packets from the source node and transmits the data packets to the at least one mobile node, comprising:

receiving response signals to the data packets from the at least one mobile node;

calculating a capacity of a wireless link between the at least one mobile node and the router;

adjusting, by the router, window field values in the response signals;

transmitting the response signals of the adjusted window field values to the source node; and sequentially transmitting the data packets on the basis of the adjusted window field values, wherein the router performs the receiving, the adjusting, and the transmitting, and wherein the source node performs the sequential transmitting, wherein the calculating of the capacity of the wireless link includes calculating the capacity of the wireless link based on a ratio of a bandwidth of the wireless link to a number of the received response signals received from the at least one mobile node for a unit time.

13. A communication method, comprising:

sequentially transmitting data packets from a source node to a router;

storing the data packets received from the source node in a storage area of a buffer of the router;

transmitting the data packets stored in the buffer to a mobile node via a wireless link in a specified order and at specified intervals while copying and storing the data packets transmitted to the mobile node in the buffer;

determining whether a response packet is received from the mobile node within a specified time after the data packets are transmitted to the mobile node;

retransmitting the copied data packets stored in the buffer when the received response packet is not received within the specified period of time;

deleting the copied data packets when the received response packet is received within the specified time;

determining, by the router, the capacity of the wireless link;

determining a window field value based on the capacity of the wireless link;

transmitting the received response packet of the adjusted window field value to the source node; and transmitting subsequent sequential data packets from the source node to the router based on the window field value of the received response packet, wherein the determining the capacity of the wireless link includes:

calculating a ratio of the bandwidth of the wireless link to a number of received response packets received by the router for a unit time; and counting the number of received response packets received for the unit time by monitoring the received response packets received by the router.

14. The communication method as claimed in claim 13, wherein the determining a window field value includes comparing a window field value in the received response packet with the determined capacity of the wireless link, transmitting the received response packet to the source node when the window field value is less than the capacity of the wireless link, and adjusting the window field value in the received response packet to the capacity of the wireless link when the window field value is greater than the capacity of the wireless link.

15. A method of lessening network congestion between a source node and a mobile node through a router providing a wireless link between the router and the mobile node, with the wireless link having an asymmetrical bandwidth environment, the method comprising:

determining the capacity of the wireless link;

adjusting, by the router, a window field value, of a response packet received from the mobile node, based on the capacity of the wireless link;

transmitting the received response packet with the adjusted window field value to a source node; and transmitting sequential data packets from the source node to the router based on the window field value, wherein the capacity of the wireless link is calculated based on a ratio of a bandwidth of the wireless link to a number of received response packets received from at least one mobile node for a unit time.

16. A method of preventing congestion in a router having a wire network link to a source node and wireless network link to a mobile node, comprising:

comparing, by the router, a capacity of the wireless link, between the mobile node and the router, with a window field value of the mobile node upon receipt of a response from the mobile node; and adjusting, by the router, downwardly an amount of data to be transmitted from the source node to the router, through the wire network link, adjusting the window field value of the response, based on a smallest bandwidth capacity of any portion of the wireless link, and by forwarding the response to the source with the adjusted window field value wherein the capacity of the wireless link is calculated based on a ratio of a bandwidth of the wireless link to a number of received response signals received from at least one mobile node for a unit time.

17. The method of claim 16, wherein the amount of data transmitted from the source node is based on the adjusted field window transferred to the source node.

* * * * *

UNITED STATES PATENT AND TRADEMARK OFFICE
CERTIFICATE OF CORRECTION

PATENT NO. : 7,738,395 B2  Page 1 of 1
APPLICATION NO. : 10/968352
DATED : June 15, 2010
INVENTOR(S) : Ji-hoon Lee et al.

It is certified that error appears in the above-identified patent and that said Letters Patent is hereby corrected as shown below:

First page Col. 1 (Inventors), Line 2 Delete "Cheongiu-si (KR)" and insert -- Cheongju-si (KR) --, therefor.

Signed and Sealed this

Ninth Day of November, 2010

David J. Kappos
*Director of the United States Patent and Trademark Office*